United States Patent [19]

Soeder et al.

[11] Patent Number: 5,034,155

[45] Date of Patent: Jul. 23, 1991

[54] COOLING WATER TREATMENT COMPOSITION

[75] Inventors: Kenneth Soeder, Haddam; Mitchel Helfeld, Trumbull, both of Conn.

[73] Assignee: Jamestown Chemical Company, Inc., West Haven, Conn.

[21] Appl. No.: 475,931

[22] Filed: Feb. 6, 1990

[51] Int. Cl.$^5$ .............................................. C23F 11/10
[52] U.S. Cl. ......................... 252/389.23; 252/389.54; 252/389.62; 252/391; 252/394; 252/180; 252/181; 252/392; 210/699; 210/701
[58] Field of Search ................................. 210/699, 701; 252/389.54, 389.23, 391, 389.62, 392, 394, 87, 175, 180, 181, 699, 701

[56] References Cited

U.S. PATENT DOCUMENTS

| | | | |
|---|---|---|---|
| 3,751,372 | 8/1973 | Zecher | 252/181 |
| 3,755,264 | 8/1973 | Testa | 252/180 |
| 4,126,549 | 11/1978 | Jones et al. | 210/699 |
| 4,138,353 | 2/1979 | Lipinski | 210/749 |
| 4,277,359 | 7/1981 | Lipinski | 210/699 |
| 4,432,879 | 2/1984 | Greares et al. | 210/701 |
| 4,452,703 | 6/1984 | Relstou et al. | 210/701 |
| 4,576,722 | 3/1986 | Gaylor et al. | 210/699 |
| 4,606,890 | 8/1986 | Fisk | 210/696 |
| 4,663,053 | 5/1987 | Geiger | 210/701 |
| 4,798,675 | 1/1989 | Lipinski et al. | 210/699 |
| 4,927,550 | 5/1990 | Cutcher et al. | 252/32.5 |
| 4,973,409 | 11/1990 | Cook | 210/699 |

*Primary Examiner*—Deborah L. Kyle
*Assistant Examiner*—Valerie Fee
*Attorney, Agent, or Firm*—Bachman & LaPointe

[57] ABSTRACT

Composition for treating cooling water including a combination of ingredients for combatting a variety of problems, such as corrosion, scale control and microbiological growth. Composition obviates the necessity for separately feeding several materials. Compositon includes at least 1% sodium molybdate, at least 0.1% benzotriazole, at least 0.5% citric acid and at least 5% of a microbiocide.

6 Claims, No Drawings

COOLING WATER TREATMENT COMPOSITION

BACKGROUND OF THE INVENTION

Water is widely used within buildings and elsewhere as a heat transfer medium; however, numerous problems exist which require careful water management. For example, potential water use problems include but are not limited to scale formation, corrosion problems and microbiological growth. Any one or a combination of these factors as well as others can result in insufficient heat transfer with consequent requirement for high energy costs, or even other problems such as fouling.

Conventionally, water treatment is used to minimize or prevent these problems. This frequently involves for example the separate addition of a variety of additives to the water each to respond to a specific problem. For example, separate materials can be added as corrosion inhibitors, scale control additives, iron and suspended solids dispersants, microbiocides and the like. The use of such separate materials each with its own function involves the use of complex treatment problems including the addition of several different materials each at its own rate. This obviously presents a considerable expense and inconvenience to separately feed a plurality of materials including separate storage and drum disposal problems, separate feeding means and increased equipment costs, increased handling and manpower time and expense, and a considerable space problem required by the use of such plural materials.

It is highly desirable to develop an improved composition involving the use of a single mixture of components which can be conveniently added to cooling water and which will treat a variety of separate problems.

It is therefore a principal object of the present invention to provide an improved cooling water composition involving the use of a single mixture of components for treating a variety of separate problems.

It is a further object of the present invention to provide a composition as aforesaid which is simple and convenient to use and which provides significant advantages, such as lower costs, less pumping and equipment requirements and decreased manpower and handling time and expense.

Further objects and advantages of the present invention will appear hereinbelow.

SUMMARY OF THE INVENTION

In accordance with the present invention it has now been found that the foregoing objects and advantages may be readily obtained and an improved cooling water treatment composition obtained which greatly simplifies the treatment of cooling water. The composition of the present invention consists essentially of an aqueous solution of at least 1% and preferably less than 25% sodium molybdate as a corrosion inhibitor, at least 0.1% and preferably less than 4% benzotriazole as a corrosion inhibitor, at least, 0.5% and preferably less than 25% citric acid as an iron dispersant, at least 5% and preferably less than 50% of a microbiocide and preferably tris(hydroxymethyl)nitromethane as a microbiocide, and the balance essentially water.

As used throughout the instant specification all percentages refer to percents by weight.

The composition of the present invention represents a single mixture which can be added to cooling water to combat a variety of problems. This obviates the necessity for expensive and inconvenient separate storage and separate feeding of individual components. Moreover, the components of the instant composition are chemically compatible and are easily formulated into the instant composition. The instant composition is extremely versatile, for example, it can be readily fed into the cooling matter on a continuous basis or in a single slug addition. Moreover, the instant composition represents a significant cost savings in reduced drum disposal problems, reduced pumping and equipment requirements and decreased handling and manpower time and expense. In addition, since only a single composition is used the instant composition is less error prone than separate feeding of individual components. Still further, the present composition is non-odorous, hygenically-safe and environmentally-sound.

A particular advantage of the instant composition is that additional components are readily compatible therewith to form a single, more complex composition for more effective water treatment. For example, advantageously one can employ at least 1% of at least one additional corrosion inhibitor, as phosphonohydroxyacetic acid and generally below 10%. In addition, one can advantageously employ at least 0.25% of at least one scale control additive and generally less than 10% of same, such as at least 0.5% of maleic anhydride polymer with ethyl acrylate and vinyl acetal, or at least 0.25% of 2-phosphono-1,2,4-butanetricarboxylic acid. Further, one can also advantageously employ at least 0.25% of at least one iron dispersant and generally less than 10% of same, such as a sulfonated styrene maleic anhydride copolymer or a polyacrylate copolymer.

In addition and surprisingly the advantageous properties of the present composition are greater than would be anticipated from be individual components so that synergistic activity is taking place.

Further modifications and advantages of the present composition will appear hereinbelow.

DETAILED DESCRIPTION

The composition of the present invention is utilized with recirculating cooling water. An open recirculating cooling water system results in evaporation of some of the cooling water. Cooled water is returned to the refrigeration equipment and removes heat from mechanical processes such as air conditioning or industrial applications. As water is evaporated pure water evaporates and results in a concentration of contaminants such as scale, oxide deposits, bacterial growth and corrosion problems. Historically several products are added to the water system with separate pumping and feeding means which results in difficult control and management problems, expense and frequent error. The single composition of the present invention obviates these problems. The materials are compatible one with the other and may be continuously added to the system in a predetermined rate depending upon the system.

The composition of the present invention can be advantageously used as a single cooling water composition for addition to cooling water in order to impact a variety of adverse conditions. In alternative and preferred embodiments, additional additives to the composition may be made to achieve particularly preferred results. It is particularly advantageous that the instant composition is an environmentally-sound, hygenically-safe aqueous composition which can be safely stored for long periods of time and with respect to which no adverse inter-reactions between components take place.

At least 1% of sodium molybdate is employed in the composition of the present invention. Preferably, from 6-12% and generally less than 25% is employed, although the upper limit is dictated by economics and the solubility in water. The sodium molybdate component of the mixture operates as a corrosion inhibitor, for example with respect to iron, steel, copper, aluminum and zinc. Either the sodium molybdate dihydrate or sodium molybdate solution can be used depending on convenience.

At least 0.1% benzotriazole is employed and preferably from 0.3-2% and generally less than 4% as a corrosion inhibitor especially for copper and copper alloys.

At least 0.5% of citric acid is employed and preferably from 2-15% and generally less than 25% as an iron dispersant and a solvent for the benzotriazole.

At least 5% of a microbiocide is employed and preferably from 15-25% and generally less than 50%. The preferred microbiocide is tris(hydroxymethyl)nitromethane and especially good results are obtained with this material; however, others can be used, as for example, glutaraldehyde (1,5-pentanediol) and 2,2-dibromo-3-nitrilopropionamide.

The balance of the mixture is essentially water.

As indicated hereinabove, one may advantageously include additional components in the mixture in order to obtain desirable and preferred results. These additional components are particularly preferred since they have been found to obtain highly desirable results with the components of the present invention without adverse inter-reactions and in an environmentally-sound composition which is stable over a long period of time. Thus, the additional components further obviate the necessity for additional separate metering of components into the cooling water system.

In accordance with the present invention one may include at least 1% of at least one additional corrosion inhibitor. A particularly preferred corrosion inhibitor so employed is phosphonohydroxyacetic acid, such as the material sold under the tradename Belclor 575 and particularly advantageous results have been obtained with this material. The upper limit of this material is based on economics although generally less than 10% is employed and preferably from 2-6%.

In addition, one may advantageously employ at least 0.25% of at least one scale control additive. A particularly preferred scale control additive is the maleic anhydride polymer with ethyl acrylate and vinyl acetate, such as the material sold under the tradename Belclene 283, in an amount of at least 0.5%. Alternately, one can employ 2-phosphono-1,2,4-butanetricarboxylic acid. Preferably from 2-6% of these materials are employed and generally less than 10%.

As a further preferred embodiment one can employ at least 0.25% of at least one additional iron dispersant such as a sulfonated sytrene maleic anhydride copolymer or a polyacrylate copolymer, such as the material sold under the tradename Aquatreat AR-626. Preferably from 2-6% of these materials are employed and generally less than 10%.

Thus it can be readily seen that the mixture of the present invention readily achieves a variety of goals in a single composition. The mixture is an aqueous mixture which is environmentally-sound and which is stable over a long period of time. The material can be continuously metered into the cooling water system or fed in a batch wise manner. Continuous metering is preferred. Naturally the metering rate will depend upon the particular cooling water system, although feed rates can vary, the product is typically fed to the system at a rate sufficient to achieve a concentration of 50–600 ppm (by weight) of product in the recirculating cooling water. An average feed rate for a typical cooling water system would be to feed 300 parts per million of the composition into the cooling water system. It is a particular advantage of the composition of the present invention that over feeding will not cause precipitation problems and subsequent operating problems in the cooling water system.

The present invention and advantages thereof will be illustrated in the following examples.

EXAMPLE I

This example illustrates the corrosion and deposit control characteristics of the composition of the present invention. The composition of the present invention used in this example was as follows:

| | |
|---|---|
| sodium molybdate | 7.4% |
| maleic anhydride copolymer with ethyl acrylate and vinyl acetate | 3.0% |
| 2-phosphono - 1, 2, 4 butanetricarboxylic acid | 1.0% |
| sulfonated styrene maleic anhydride copolymer | 2.0% |
| phosphonohydroxyacetic acid | 4.0% |
| polyacrylate copolymer | 2.0% |
| citric acid | 2.0% |
| benzotriazole | 0.5% |
| tris(hydroxymethyl)nitromethane | 20% |
| water | balance |

The corrosion and deposit control attributes were tested in a pilot cooling water system including a cooling tower, heat exchangers, sites for corrosion coupons, pumps and flow control values and means for providing additive and water make-up. This pilot cooling system duplicates conditions actually encountered in an operating system and has been found to provide reliable corrosion and deposit data. The following operating parameters and recirculating water characteristics were used.

| Operating Parameter | Value |
|---|---|
| Heat Flux: | 5,000 BTU/HR/Ft$^2$ |
| Water Velocity: | 3.0 ft/sec. |
| Basin Water Temperature: | 104° F. |
| System Half-Life: | 17.5 hours |
| Recirculating Water Chemistry | Values |
| Calcium, (ppm as CaCO$_3$): | 350 |
| Magnesium, (ppm as CaCO$_3$): | 170 |
| "M" Alkalinity (ppm as CaCO$_3$): | 110 |
| pH: | 8.5 |

The composition of the present invention set out above was fed to the system at a rate of 300 ppm (as product) to provide a molybdate residual of 10 ppm (as MoO$_4$). Residual levels were monitored on a daily basis throughout the course of a 14-day trial. Sufficient product was continuously added to the system to replace material lost through blowdown.

Despite operating under such rigorous yet realistic conditions, the composition of the present invention provided the following corrosion and deposition results:

| Test Specimen | Test Results Corrosion Rate (mils per year) | Deposit Rate (mg deposit/cm$^2$/day) | Evaluation |
|---|---|---|---|
| Admiralty Heat Exchanger | 0.17 | 0.026 | Good to Excellent |
| Admiralty Coupon #1 | 0.26 | 0.025 | Good to Excellent |
| Admiralty Coupon #2 | 0.31 | 0.022 | Good to Excellent |
| Mild Steel Coupon #1 | 3.46 | 0.149 | Good to Excellent |
| Mild Steel Coupon #2 | 3.83 | 0.172 | Good to Excellent |

EXAMPLE II

This example illustrates the bacteria control characteristics of the composition of the present invention and uses the composition of Example I. This test used controlled laboratory conditions. In the study, a Population Density Test was used to determine the percent reduction in the bacteria count of a cooling water sample after exposure to a predetermined concentration of the composition of the present invention. As outlined in the following analytical procedure, the Population Density Test used in the evaluation accurately simulates actual cooling tower operation, in that the collected recirculating water sample was treated with a known dose of the microbiocide:

Population Density Test Procedure

1. Water samples were first collected from three separate, operating cooling water systems. To ensure the presence of viable bacteria populations within the recirculating waters, the systems were not treated with a microbiocide for one week prior to the sampling date.

2. Once collected, 40 ml aliquoits of each test sample were measured into separate culture flasks.

3. An amount of the composition of the present invention needed to obtain a 300 ppm (as product) concentration of the treatment in the sample was then added to the culture flasks A buffer solution was also added to each flask to maintain pH levels within the 7.8-8.3 range.

4. Two untreated control samples for each test system (10 samples overall), along with the three treated culture flasks, were then placed on a rotary shaker and agitated at room temperature.

5. At the end of 24, 48 and 72 hours, aliquoits from each sample were then removed from the flasks and enumerated using standard plate count procedures.

6. After incubation at 37° C. for 48 hours, all of the plates were counted and results recorded. The percent reduction in the bacteria counts was determined through use of the following formula:

Percent Reduction Calculation $$\text{Percent Reduction} = \frac{A - B}{A} \times 100$$

where:

A = The average of the two control counts (expressed as colonies per ml)

B = The count of the treated flask (expressed as colonies per ml).

The results are set out in Table I, below.

Based upon the results presented in Table I, it is apparent that the composition of the present invention is an efficacious cooling water treatment microbiocide, as upon exposure to recommended concentrations of the product for a 24-hour period, the bacteria counts of the treated samples were reduced by over 99.99 percent when compared to the control samples. Even more impressive results, clearly showing a five order of magnitude decrease in the bacteria counts of the test samples, were observed when exposure times were increased to 48 and 72 hours. Such data is especially encouraging, as each of the cooling systems used to obtain the test samples had been treated for at least one year previous to the collection date with the tris(hydroxymethyl)nitromethane microbiocide, a situation that commonly leads to the emergence of resistant bacteria species and a loss of product performance.

TABLE I

| | POPULATION DENSITY TEST | | |
|---|---|---|---|
| Sample No. | Untreated Averaged Control Samples Population Count | Treated Sample Population Count | Percent Reduction |
| | 24-Hr. Exposure Period | | |
| 1 | 2.75 × 10$^8$ | 2.6 × 10$^5$ | 99.90 |
| 2 | 3.15 × 10$^8$ | 1.3 × 10$^5$ | 99.95 |
| 3 | 4.9 × 10$^8$ | 8.9 × 10$^5$ | 99.81 |
| | 48-Hr. Exposure Period | | |
| 1 | 3.95 × 10$^8$ | 3.1 × 10$^4$ | 99.98 |
| 2 | 4.75 × 10$^9$ | 7.9 × 10$^4$ | 99.99 |
| 3 | 4.70 × 10$^9$ | 9.6 × 10$^4$ | 99.99 |
| | 72-Hr. Exposure Period | | |
| 1 | 7.20 × 10$^9$ | 3.9 × 10$^4$ | 99.99 |
| 2 | 8.95 × 10$^9$ | 6.2 × 10$^4$ | 99.99 |
| 3 | 8.60 × 10$^9$ | 1.1 × 10$^5$ | 99.99 |

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Cooling water treatment composition consisting essentially of an aqueous solution of at least 1% sodium molybdate as a corrosion inhibitor, at least 0.1% benzotriazole as a corrosion inhibitor, at least 0.5% citric acid as an iron dispersant, and at least 5% of a microbiocide selected from the group consisting of tris(hydroxymethyl)nitromethane, glutaraldehyde and 2,2-dibromo-3-nitrilopropionamide and the balance essentially water.

2. A composition according to claim 1 including less than 25% sodium molybdate, less than 4% benzotriazole, less than 25% citric acid and less than 50% tris(hydroxymethyl)nitromethane.

3. A composition according to claim 1 including at least 1% phosphonohydroxyacetic acid as an additional corrosion inhibitor.

4. A composition according to claim 1 including at least 0.25% of a scale control additive selected from the group consisting of (1) maleic anhydride copolymer with ethyl acrylate and vinyl acetate and (2) 2-phosphono-1,2,4-butanetricarboxylic acid.

5. A composition according to claim 1 including at least 0.25% of an additional iron dispersant selected from the group consisting of (1) sulfonated styrene maleic anhydride copolymer and (2) polyacrylate copolymer.

6. A composition according to claim 1 wherein the composition is used at a concentration of from 50 to 600 parts per million of the composition based on the total cooling water.

* * * * *